United States Patent
Wedig

(10) Patent No.: US 12,165,247 B2
(45) Date of Patent: Dec. 10, 2024

(54) ARTIFICIAL INTELLIGENCE FOR CAPTURING FACIAL EXPRESSIONS AND GENERATING MESH DATA

(71) Applicant: Sony Interactive Entertainment LLC, San Mateo, CA (US)

(72) Inventor: Geoff Wedig, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 347 days.

(21) Appl. No.: 17/711,886

(22) Filed: Apr. 1, 2022

(65) Prior Publication Data

US 2022/0327755 A1 Oct. 13, 2022

Related U.S. Application Data

(60) Provisional application No. 63/170,328, filed on Apr. 2, 2021.

(51) Int. Cl.
*G06T 13/40* (2011.01)
*A63F 13/213* (2014.01)
(Continued)

(52) U.S. Cl.
CPC ............ *G06T 13/40* (2013.01); *A63F 13/213* (2014.09); *G06T 17/20* (2013.01); *G06V 10/764* (2022.01);
(Continued)

(58) Field of Classification Search
CPC ..... G06T 13/40; G06T 17/20; G06T 2200/04; G06T 2200/08; G06T 17/00;
(Continued)

(56) References Cited

U.S. PATENT DOCUMENTS

2017/0039752 A1 2/2017 Quinn et al.
2018/0253593 A1 9/2018 Hu et al.
(Continued)

FOREIGN PATENT DOCUMENTS

| CN | 109903368 A | 6/2019 |
|---|---|---|
| CN | 109978984 A | 7/2019 |
| CN | 111325846 A | 6/2020 |

OTHER PUBLICATIONS

"Action unit detection in 3D facial videos with application in facial expression retrieval and recognition" by Antonios Danelakis, et al. published to Multimed Tools Appl Mar. 28, 2018 (Year: 2018).*
(Continued)

*Primary Examiner* — Peter J Iannuzzi
(74) *Attorney, Agent, or Firm* — PENILLA IP, APC

(57) ABSTRACT

Methods and systems are provided for training a model used for animating a facial expression of a game character. The method includes capturing mesh data of a first human actor using a three-dimensional (3D) camera to generate three-dimensional (3D) depth data of a face of the first human actor. In one embodiment, the 3D depth data is output as mesh files corresponding to a frame captured by the 3D camera. The method includes capturing two-dimensional (2D) point cloud data of the first human actor using a 2D camera. In one embodiment, the 2D point cloud data represents tracked dots present on the face of the first human actor. In another embodiment, the 2D point cloud data is processed to generate training label value files (tLVFs). The method includes processing the mesh data in time coordination with the tLVFs associated with the 2D point cloud data to train the model. The model is configured to receive input mesh files captured from a second human actor and generate as output LVFs corresponding to the input mesh files.

20 Claims, 11 Drawing Sheets

(51) Int. Cl.
  *G06T 17/20* (2006.01)
  *G06V 10/764* (2022.01)
  *G06V 10/774* (2022.01)
  *G06V 10/776* (2022.01)
  *G06V 40/16* (2022.01)
  *H04N 13/25* (2018.01)

(52) U.S. Cl.
  CPC ........ *G06V 10/7747* (2022.01); *G06V 10/776* (2022.01); *G06V 40/168* (2022.01); *G06V 40/174* (2022.01); *H04N 13/25* (2018.05); *G06T 2200/04* (2013.01); *G06T 2200/08* (2013.01)

(58) Field of Classification Search
  CPC ................ A63F 13/213; G06V 10/764; G06V 10/7747; G06V 10/776; G06V 40/168; G06V 40/174; H04N 13/25
  See application file for complete search history.

(56) References Cited

U.S. PATENT DOCUMENTS

2021/0012549 A1\* 1/2021 Comer .................... G06F 18/22
2021/0012550 A1  1/2021 Orvalho et al.

OTHER PUBLICATIONS

111112264 Search Report, Dec. 29, 2023 from Taiwan Office Action.
PCT/US2022/022952, Notification of Transmittal of the International Search Report and the Written Opinion of the International Searching Authority, or the Declaration, PCT/ISA/220, and the International Search Report, PCT/ISA/210, Jul. 26, 2022.
Antonios et al., "Action unit detection in 3D facial videos with application in facial expression retrieval and recognition", Multimedia Tools and Application, Klumer Academic Pub., Boston, US, vol. 77, No. 19, Mar. 28, 2019, pp. 24813-24841, XP036580469, ISSN: 1380-7501, DOI: 10.1007/S11042-018-5699-9.
Zhang et al., "BP4D-Spontaneous: a high-resolution spontaneous 3D dynamic facial expression database", Image andVision Computing, vol. 32, No. 10, Oct. 1, 2014, pp. 692-706, XP055939182, Guildford, GB, ISSN: 0262-8856, DOI: 10.1016/j.imavis, 2014.06. 002. https://www.sciencedirect.com/science/article/pii/S0262885614001012/pdfft?md5=37f723c0421f6a0e870d1082b628c03&pid=1-s2.0-S0262885614001012-main.pdf>.
Panagiotis et al., "Feature fusion for facial landmark detection", Pattern Recognition, vol. 47, No. 9, Mar. 20, 2014, pp. 2783-2793, XP028653932, ISSN: 0031-3203, DOI: 10.1016/J.PATCOG.2014. 03.007.

\* cited by examiner

Label Value File Table

| Input Mesh File ID | Output LVF ID | Emotion | Description | Facial Feature 1 | Facial Feature 2 | Facial Feature 3 | Facial Feature 4 | Facial Feature 5 | Facial Feature 6 | Facial Feature 7 | Facial Feature 8 | Facial Feature 9 | ... | Facial Feature N |
|---|---|---|---|---|---|---|---|---|---|---|---|---|---|---|
| IMF-1 | OLVF-1 | Anger | Eyebrows down and together; eyes glare; narrowing of lips | 0.2 | 0.3 | 0.6 | 1.0 | 0.4 | 0.8 | 0.8 | 0.9 | 0.8 | | 0.2 |
| IMF-2 | OLVF-2 | Fear | Eyebrows raised; raised upper eyelid; tense lower eyelids; lips slightly stretched | 0.7 | 0.4 | 0.1 | 0.0 | 1.0 | 0.6 | 0.3 | 0.4 | 0.5 | | 0.3 |
| IMF-3 | OLVF-3 | Sadness | Drooping upper eyelids; loosing focus in eyes; slight pull down of lip corners | 0.4 | 0.3 | 0.8 | 0.7 | 0.7 | 0.2 | 0.9 | 0.8 | 0.8 | | 0.5 |
| IMF-4 | OLVF-4 | Contempt | Lip corner tightened and raised on only one side of face | 0.5 | 0.6 | 1.0 | 0.4 | 0.9 | 0.7 | 0.6 | 0.6 | 0.9 | | 0.1 |
| IMF-5 | OLVF-5 | Disgust | Nose wrinkling; upper lip raised | 0.2 | 0.0 | 0.4 | 0.1 | 0.9 | 0.5 | 0.6 | 0.9 | 0.5 | | 0.7 |
| ... | ... | ... | ... | | | | | | | | | | | |
| IMF-5 | OLVF-5 | Surprise | Eyebrows raised; eyes widened; mouth open | 0.4 | 0.7 | 0.5 | 0.1 | 0.6 | 0.3 | 0.7 | 0.4 | 0.1 | | 0.7 |

Fig. 3C

ARTIFICIAL INTELLIGENCE FOR CAPTURING FACIAL EXPRESSIONS AND GENERATING MESH DATA

CLAIM OF PRIORITY

This application claims priority under 35 U.S.C. 119(e) to U.S. Provisional Patent Application No. 63/170,328, filed Apr. 2, 2021, the disclosure of which is incorporated herein by reference in its entirety for all purposes.

BACKGROUND

1. Field of the Disclosure

The present disclosure relates generally to animating facial expressions of game characters, and more particularly to methods and systems for training a model used for animating a facial expression of a game character.

2. Description of the Related Art

The video game industry has seen many changes over the years. In particular, technology related to facial animation in video games have become more sophisticated over the past several years resulting in game characters appearing more and more realistic. Today, game characters can express mood and emotions like a human face, which results in players feeling more immersed in the game world. To this end, developers have been seeking ways to develop sophisticated operations that would improve the facial animation process which would make the process more efficient and less time consuming.

A growing trend in the video game industry is to improve and develop unique ways that will enhance and make the facial animation process of game characters more efficient. Unfortunately, current facial animation processes are expensive, time consuming, and involves precise planning and directing. For example, a facial animation process may involve various individuals (e.g., directors, actors, designers, animators, etc.) with different skill-sets that contribute to the production of animating game characters. Current facial animation process may be extremely time consuming and expensive. Animators and designers, for example, contribute to the facial animation process by creating thousands of blend shape files and joint files that are used for animating a particular game character. Blend shape files and joint files are difficult to generate. Animators and designers may need several months to create the blend shape files and joint files that are necessary to animate the facial expression of a game character. Unfortunately, this process is extremely time-consuming and expensive. As a result, the current process of producing facial animation for game characters can be inefficient which may not be effective in achieving high quality results under tight schedules.

It is in this context that implementations of the disclosure arise.

SUMMARY

Implementations for the present disclosure include methods, systems, and devices relating to training a model used for animating facial expressions of game characters. In some embodiments, methods are disclosed to enable capturing facial expressions of a human actor using one or more cameras to produce two-dimensional (2D) point cloud data and three-dimensional (3D) mesh data which are used for training an Artificial Intelligence (AI) model. For example, training the model may involve using a human actor that is directed to perform various facial expressions such as joy, fear, sadness, anger, etc. which are captured by a 2D camera and a 3D camera. In one embodiment, the 2D camera and the 3D camera produces 2D point cloud data and 3D mesh data, respectively, which are used by a solver to train the model. Once the model trained, the model can be configured to receive input mesh files associated with any human actor which can generate output label value files (OLVFs) that corresponds to the input mesh files. In one embodiment, the OLVFs can be used by a game engine to animate the facial expression of a game character. Accordingly, the methods disclosed herein outline ways of using a trained model to generate OLVFs using input mesh files of a human actor. Thus, when new facial expressions are desired for animating a facial expression of a game character, any human actor can be used to capture the input mesh files for the new facial expressions which are processed through the model to generate the OLVFs. In this way, new facial expressions for game characters can be animated without obtaining new blend shape files and joint files for the desired facial expressions.

In one embodiment, a method for training a model used for animating a facial expression of a game character is provided. The method includes capturing mesh data of a first human actor using a three-dimensional (3D) camera to generate three-dimensional (3D) depth data of a face of the first human actor. In one embodiment, the 3D depth data is output as mesh files corresponding to a frame captured by the 3D camera. The method includes capturing two-dimensional (2D) point cloud data of the first human actor using a 2D camera. In one embodiment, the 2D point cloud data represents tracked dots present on the face of the first human actor. In another embodiment, the 2D point cloud data is processed to generate training label value files (tLVFs). The method includes processing the mesh data in time coordination with the tLVFs associated with the 2D point cloud data to train the model. The model is configured to receive input mesh files captured from a second human actor and generate as output LVFs corresponding to the input mesh files.

In another embodiment, a method for generating label values for facial expressions using three-dimensional (3D) image capture is provided. The method includes accessing a model that is trained using inputs captured from a human actor. In one embodiment, the inputs captured include mesh data of a face of the human actor, the mesh data representing three-dimensional (3D) depth data of the face. In another embodiment, the inputs captured further include two-dimensional (2D) point cloud data of the face of the human actor. In one embodiment, the 2D point cloud data represents tracked dots present on the face of the human actor, the 2D point cloud data being processed to generate training label value files (tLVFs). In other embodiments, the model being trained by processing in time coordination the mesh data and the tLVFs, such that correspondences between the tLVFs and the mesh data are learned by the model. The method includes capturing mesh files that include mesh data of a face of a second human actor, the mesh files being provided as input queries to the model to request label value files (LVFs) that correspond to respective ones of the captured mesh files. In one embodiment, the LVFs are usable by a game engine to animate a facial expression of a game character presented in a game processed by the game engine.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 3C illustrates an embodiment of an LVF table illustrating various output LVFs that are generated by the model using input mesh files captured from an actor, in accordance with an implementation of the disclosure.

DETAILED DESCRIPTION

Figure 1:
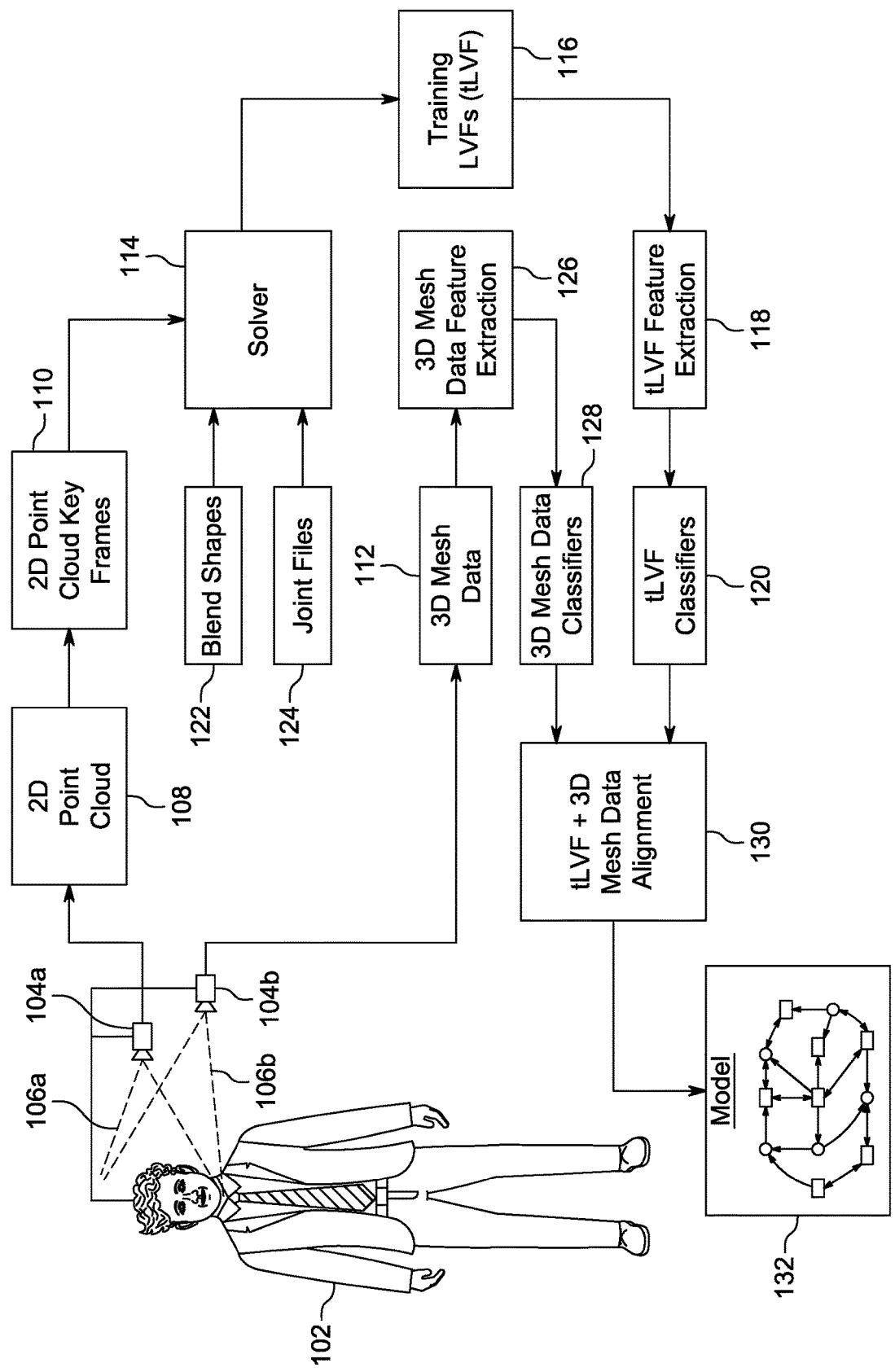
FIG. 1 illustrates an embodiment of a system configured to train a model using 2D point cloud data and 3D mesh data captured by a 2D camera and 3D camera, respectively, in accordance with an implementation of the disclosure.

The following implementations of the present disclosure provide methods, systems, and devices for training an Artificial Intelligence (AI) model used for animating a facial expression of a game character. By way of example, in one embodiment, the model is trained using three-dimensional (3D) mesh data and two-dimensional (2D) point cloud data captured by one or more cameras that are configured to capture various facial expressions of a human actor. In one embodiment, a solver is configured to receive the 3D mesh data, the 2D point cloud data, blend shape files, and joint files for training of the AI model. In some embodiments, once the model is trained, the model can be configured to receive input mesh files captured from any human actor for generating output LVFs. Accordingly, the generated output LVFs can be used for animating the facial expression of various game characters in a video game.

The use of the model and the input mesh files of an actor facilitates an efficient way of animating various facial expressions of game characters since additional blend shape and joint files are no longer needed since the model has been trained. For example, the training of the model may involve using an initial set of blend shape files that correspond to facial emotions such as sadness, anger, contempt, disgust, and fear. If it is desired for a game character to express an emotion of "surprised," the model can be configured to generate output LVFs associated with the "surprised" facial expression even though the training of the model did not include blend shape files that correspond to the "surprised" emotion. This eliminates the need of an animator having to produce blend shape files associated with the "surprised" emotion which may lead to reduced operational costs and time. Generally, the methods described herein provides a more efficient way for animating the facial expressions of game characters using a model which in turn can reduce overall operating costs and time spent on producing blend shape files and joint files.

By way of example, a method is disclosed that enables training a model used for animating a facial expression of a game character. The method includes capturing mesh data of a first human actor using a 3D camera to generate 3D depth data of a face of the first human actor. In one example, the 3D depth data is output as mesh files corresponding to a frame captured by the 3D camera. In one embodiment, the method may further include capturing 2D point cloud data of the first human actor using a 2D camera. In one example, the 2D point cloud data represents tracked dots present on the face of the first human actor. In another embodiment, the 2D point cloud data is processed to generate training label value files (tLVFs). In another embodiment, the method may include processing the mesh data in time coordination with the tLVFs associated with the 2D point cloud data to train the model. In one example, the model is configured to receive input mesh files captured from a second human actor and to generate as output LVFs corresponding to the input mesh files. It will be obvious, however, to one skilled in the art that the present disclosure may be practiced without some or all of the specific details presently described. In other instances, well known process operations have not been described in detail in order not to unnecessarily obscure the present disclosure.

In accordance with one embodiment, a system is disclosed for capturing the facial expressions of an actor to train a model used for animating facial expressions of game characters in a video game. In one embodiment, the system includes a plurality of cameras that are configured to capture various facial expressions produced by an actor. In one embodiment, the plurality of cameras may include a 2D camera and a 3D camera. In some embodiments, the 2D camera and the 3D camera may can produce 2D point cloud files and 3D mesh data, respectively. In some embodiments, a solver may be configured to receive a plurality of input files such as the 2D point cloud files, the 3D mesh data, blend shape files, joint files for processing to train the model.

In one embodiment, the training of the model may include a solver that is configured to use the blend shape files, joint files, and various rules to process the 2D point cloud files to understand and identify the various expressions that are present in the 2D point cloud files. In some embodiments, the solver is configured to generate training label value files (tLVFs) that correspond to each key frame of the 2D point cloud files. In one embodiment, the tLVFs are labels that are descriptive of the expression in the key frame of the 2D point cloud files. In accordance with another embodiment, the training of the model may include an alignment operation that is configured to align the 3D mesh data captured by the 3D camera with the tLVF generated by the solver.

In some embodiments, the trained model can be configured to receive input mesh files captured from a second human actor. Using the input mesh files, the model is used to generate output LVFs that correspond to the input mesh files. In one embodiment, the generated output LVFs can be used for animating a facial expression of a game character in a video game.

With the above overview in mind, the following provides several example figures to facilitate understanding of the example embodiments.

FIG. 1 illustrates an embodiment of a system configured to train a model 132 using 2D point cloud data 108 and 3D mesh data 112 captured by a 2D camera 104a and 3D camera 104b, respectively. As shown in FIG. 1, in one embodiment, the system may include a 2D camera 104a and a 3D camera 104b that is configured to capture the facial expressions of an actor 102 to produce the 2D point cloud data 108 and the 3D mesh data 112, respectively. In one embodiment, a solver 114 is configured to receive 2D point cloud key frames 110, blend shapes 122, and joint files 124 for processing to generate training label value files (tLVFs) 116. In some embodiments, the system may include a feature extraction 118 operation that is configured to identify the features associated with the tLVFs 116 and a classifiers 120 operation that is configured classify the features using one or more classifiers. In other embodiments, the system may include a feature extraction 126 operation that is configured to identify the features associated with the 3D mesh data 112 and a classifiers 128 operation that is configured classify the features using one or more classifiers. In other embodiments, an alignment operation 130 can be configured to receive as inputs the classified features from the classifiers 120 operation and the classifiers 128 operation to align the 3D mesh data with the corresponding tLVFs. In some embodiments, the training of the model 132 may further include receiving the aligned 3D mesh data and the tLVFs from the alignment operation 130.

In some embodiments, during a performance of the actor 102, the actor may be wearing a headset that includes the 2D camera 104a and the 3D camera 104b. The actor 102 may be directed to perform various facial expressions, facial movements, eye movements, emotions, actions, poses, etc. which can be captured by the 2D camera 104a and the 3D camera 104b. For example, an actor 102 may be asked to perform a facial expression that expresses an emotional state of joy, sadness, fear, anger, surprise, disgust, contempt, and panic. In another example, the actor 102 may be asked to perform various actions such as breathing, drinking, eating, swallowing, reading, etc. Accordingly, as the actor 102 performs these actions, the cameras 104 can precisely capture the natural muscle movement in the actor's face.

In some embodiments, the 2D camera 104a is used to capture image frames of the face of the actor 102. In one embodiment, a dot pattern is disposed on the face of the actor 102 and the 2D camera is configured to capture and track the dot pattern as the actor performs. In some embodiments, as the actor 102 acts and performs various facial expressions, the 2D camera 104a is configured to digitally track the movement of the dot pattern and to generate the 2D point cloud data 108. In one embodiment, the 2D point cloud data 108 represents the tracked dots present on the face of the actor. In some embodiments, the 2D point cloud data 108 may include datasets that represent the captured images and the tracked dots represented in X, Y, and Z geometric coordinates of a single point on a captured image.

In one embodiment, the 3D camera 104b is a high-resolution camera that is configured to capture images of the face of the actor 102 to generate 3D depth data of the face of the actor 102. In one embodiment, the 3D depth data is output as mesh files that correspond to a frame captured by the 3D camera 104b. In one embodiment, the 3D mesh data 112 may include mesh files that are associated with the structural build of a 3D model of the image frames captured by the 3D camera 104b. The 3D mesh data 112 may include mesh files that use reference points in the X, Y, and Z geometric coordinates to define the height, width, and depth of the 3D model.

In some embodiments, the 2D point cloud key frames 110 of the 2D point cloud data 108, blend shapes 122, and joint files 124 may be used as inputs for the solver 114. In general, only the 2D point cloud key frames 110 rather than all of the frames of the 2D point cloud data 108 are processed and analyzed by the solver 114 to help save bandwidth and reduce redundancies. In other embodiments, all of the frames of the 2D point cloud data 108 (e.g., key frames and transition frames) can be processed and analyzed by the solver 114. In one embodiment, the blend shapes 122 may be created by an animator or designer. In some embodiments, the blend shapes 122 may be created by a technique that involves deforming a mesh to achieve a specific shape. For example, an animator or a designer may use a single base shape mesh (e.g., expressionless face) to blend or morph the mesh into a different facial expression, e.g., pursed lips, flaring nose, closed eyelid, lifted eye brow, etc. Using this method, an animator may mix and match any number of blend shapes files to animate and form the facial expression of a game character. In one example, a blend shape file with pursed lips can be combined with a blend shape file with frowning eyes to form a facial expression of "disapproval." The blend shapes 122 may include a collection of different facial expressions which can be used for animating a game character.

In some embodiments, the joint files 124 may be created by an animator or a designer. The joint files 124 may include a series of bones that are constructed to represent the skeletal structure in the face of a game character. In some embodiments, the joint files 124 can be used to manipulate the joints to achieve a desired facial expression and include a range of motion associated with the various facial features. In one example, the joint files 124 may include various joints associated with different parts of the face such as eyebrows, eyelids, eyes, between the eyes, nose bridge, corner of the mouth, front of the chin, forehead, etc. The joint files 124 may be used to control various facial expression of the face of the game character. For example, the mouth joints can facilitate the movement of the corners of the mouth for smiles and frown. In another example, the jaw joint can facilitate the opening and closing of the mouth to express an emotion of surprise and sadness.

In some embodiments, the solver 114 is configured to receive as inputs the 2D point cloud key frames 110, the blend shapes 122, and the joint files 124. In one embodiment, the solver 114 is configured to process the noted inputs to generate tLVFs 116 which identifies what facial expressions are present in the 2D point cloud key frames 110 or transition frames of the 2D point cloud data 108. In some embodiments, the solver 114 may use a combination of various rules, blend shapes 122, joint files 124 to understand what is occurring in the 2D point cloud key frames 110. For example, a 2D point cloud key frame 110 may include an image of an actor that shows the nose of the actor as being wrinkled. The solver 114 may process this key frame using rules, blend shapes, and joint files to make a determination that the nose of the actor being wrinkled may infer that the actor is expressing an emotion of "disgust." Accordingly, the solver 114 may generate tLVFs 116 that corresponds to the key frame which labels the key frame as having characteristics expressing a "disgust" facial emotion. In another embodiment, other inputs that are not direct inputs or lack of input/feedback, may also be taken as inputs to the solver 114.

Generally, the generated tLVFs 116 are labels that are descriptive of the facial expressions that are present in the 2D point cloud key frames 110 or transition frames. The tLVFs 116 may describe what is occurring in the key frames. In some embodiments, the tLVFs 116 may include a plurality of facial feature values. The facial feature values may range between 0-1 and include a total number of values ranging approximately between 50-1500 total values.

In one embodiment, after the tLVFs 116 are generated by the solver 114, a feature extraction 118 operation is configured to identify and extract various features in the tLVFs 116. After the feature extraction 118 operation processes and identifies the features from the tLVFs 116, the classifiers 120 operation is configured to classify the features using one or more classifiers. In one embodiment, the features are labeled using a classification algorithm for further refining by the model 132.

In some embodiments, the 3D mesh feature extraction 126 operation to is configured to process the 3D mesh data 112 to identify and extract various features associated with the 3D mesh data 112. After the 3D mesh feature extraction 126 operation processes and identifies the features from the 3D mesh data 112, the 3D mesh classifiers 128 operation is configured to classify the features using one or more classifiers. In some embodiments, the features are labeled using a classification algorithm for further refining by the AI model 132.

In some embodiments, the alignment operation 130 is configured to receive as inputs the classified features (e.g., tLVF classified features, 3D mesh classified features). In one embodiment, the alignment operation 130 is configured to align the 3D mesh data with the corresponding tLVFs. For example, the training of the model may include the alignment operation 130 that is configured to associate the 3D mesh data 112 captured by the 3D camera 104b with tLVFs 116 that are produced by the solver 114. Accordingly, once the 3D mesh data 112 is properly correlated with a corresponding tLVF 116, these training files may be used as input into the model 132 so that the model 132 can learn the appropriate correlations between the mesh data and the tLVFs.

In some embodiments, the AI model 132 is configured to receive as inputs the training files (e.g., 3D mesh aligned with tLVF) generated by the alignment operation 130. In another embodiment, other inputs that are not direct inputs or lack of input/feedback, may also be taken as inputs to the model 132. The model 132 may use a machine learning model to predict what the corresponding output LVFs are for a particular input mesh file. In some embodiments, over time, the training files may be used to train the model 132 to identify what is occurring in a given input mesh file. For example, the training files may include a 3D mesh of a face of an actor biting their lips which has a corresponding tLVF indicating that the actor is anxious. Accordingly, when an input mesh file includes an image of an actor biting their lips, the model 132 may predict and generate output LVFs that corresponds to an emotion of being anxious.

Figure 2A:
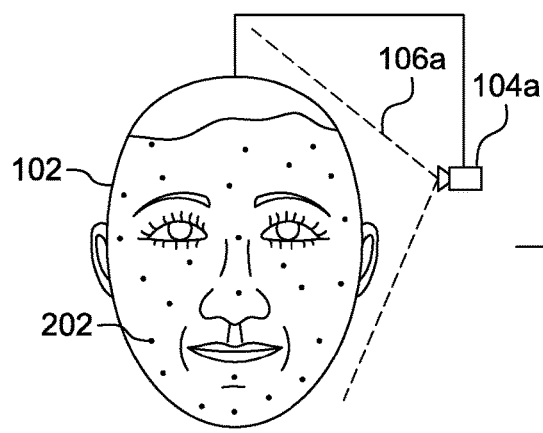
FIGS. 2A-2B illustrate a 2D camera that is configured to capture images of a face of an actor to generate 2D point cloud data, in accordance with an implementation of the disclosure.
Figure 2B:
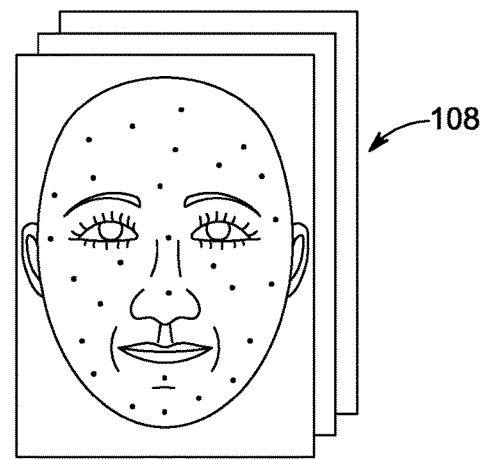

FIGS. 2A-2B illustrate a 2D camera 104a that is configured to capture images of a face of an actor 102 to generate 2D point cloud data 108. In one embodiment, as illustrated in FIG. 2A, an actor 102 is shown wearing a headset that includes a 2D camera 104a with a point of view (POV) 106a. In some embodiments, the actor 102 may have a dot pattern 202 (e.g., markers) disposed along the face of the actor 102. In one embodiment, the dot pattern 202 is applied along emotionally relevant positions of the face of the actor 102. In one embodiment, as the actor 102 poses and performs various actions (e.g., smiling, grinning, laughing, talking, fighting, etc.), the movement of the dot pattern 202 is digitally tracked by the 2D camera 104a which is configured to generate the 2D point cloud data 108 shown in FIG. 2B. In one embodiment, the 2D point cloud data 108 represents tracked dots present on the face of the actor 102. In some embodiments, the dot pattern 202 on the face of the actor 102 can be measured precisely with high accuracy using a pattern-matching algorithm.

Figure 2C:
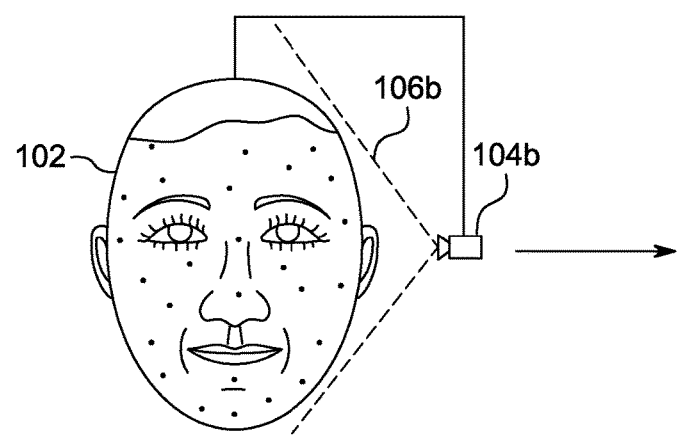
FIGS. 2C-2D illustrate a 3D camera that is configured to capture 3D mesh data representing 3D depth data of a face of an actor, in accordance with an implementation of the disclosure.
Figure 2D:
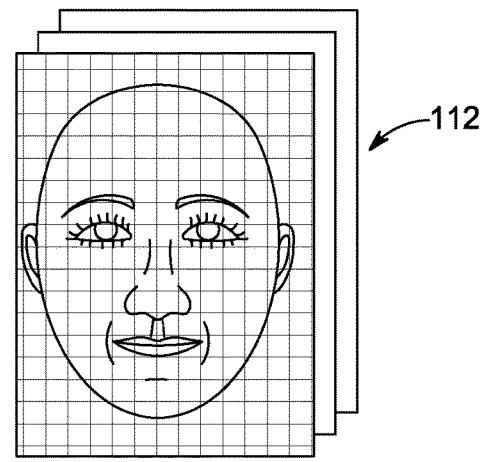

FIGS. 2C-2D illustrate a 3D camera 104b that is configured to capture 3D mesh data 112 representing three-dimensional (3D) depth data of a face of an actor 102. In one embodiment, the 3D depth data may include mesh files corresponding to a frame captured by the 3D camera. As illustrated in FIG. 2C, an actor 102 is shown wearing a headset that includes a 3D camera 104b with a POV 106b. The 3D camera 104b is configured to capture the facial expressions of the actor 102 as the actor 102 performs various facial expressions, poses, and actions. In one embodiment, as shown in FIG. 2D, the 3D mesh data 112 may include a plurality of mesh files. In some embodiments, the mesh data that is captured by the 3D camera may include a structural build of a 3D model of the image captured by the 3D camera 104b. The 3D mesh data 112 may include one or more mesh files that use reference points in the X, Y, and Z geometric coordinates to define the height, width, and depth of the 3D model.

Figure 3A:
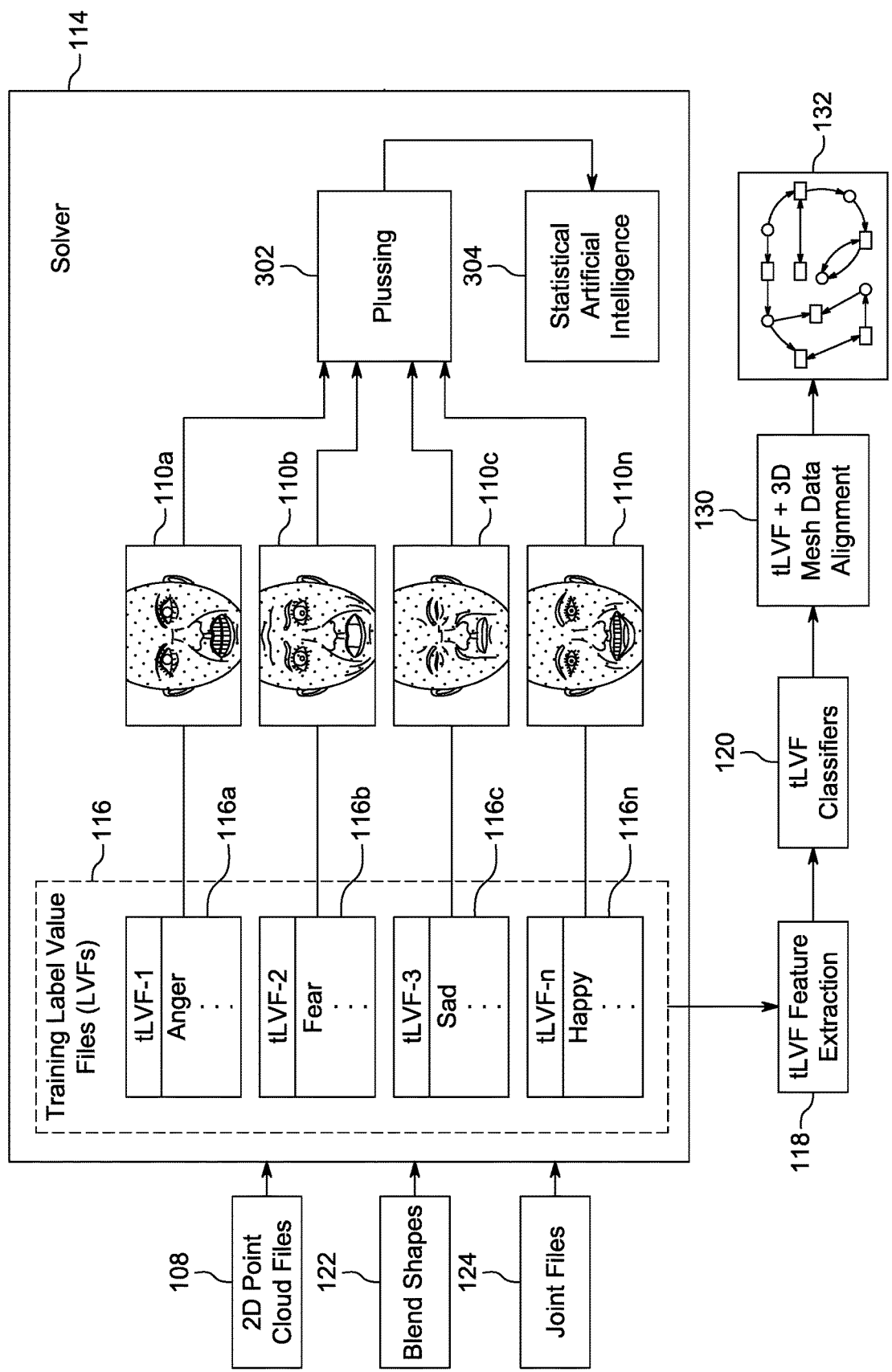
FIG. 3A illustrates an embodiment of a solver that is configured to receive one or more inputs for processing to generate tLVFs, in accordance with an implementation of the disclosure.

FIG. 3A illustrates an embodiment of a solver 114 that is configured to receive one or more inputs for processing to generate tLVFs 116. As shown in FIG. 3A, the system includes a solver 114 that is configured to receive 2D point cloud data 108 of an actor 102, blend shapes 122, and joint files 124. After the solver 114 processes the inputs and generates the tLVFs 116, the system may include a feature extraction 118 operation that is configured to extract features from the tLVFs 116 and a classifiers 120 operation that is configured to classify the extracted features. After classifying the extracted features, the system may include an alignment operation 130 that is configured to process the mesh data in time coordination with the tLVFs to train the model 132.

In some embodiments, the solver 114 may include a plussing 302 operation and statistical artificial intelligence (AI) 304 for processing the 2D point cloud data 108, blend shapes 122, and joint files 124 to generate the tLVFs 116. In one embodiment, the blend shapes 122 and joint files 124 that are used for processing by solver 114 are an initial set of files that are associated with common emotional facial expressions, e.g., disgust, anger, fear, sadness, and happiness. The initial set of blend shape and joint files are used by the solver 114 to train the model 132. Once the model 132 is trained using the initial set of blend shape and joint files, additional blend shape and joint files that correspond to other emotional facial expressions may not be required for training the model 132. For example, a model 132 is trained using blend shapes and joint files that correspond to facial emotions that include disgust, anger, fear, sadness, and happiness. If the model 132 receives and processes input mesh files corresponding to a "surprise" emotion, the model 132 can be configured to accurately generate output LVFs corresponding to the "surprise" emotion even though the model 132 was not trained using blend shapes and joint files that correspond to the "surprise" facial expression.

In one embodiment, the solver 114 may use a set of rules in combination with the blend shapes 122 and joint files 124 to interpret the 2D point cloud data 108 to determine what is occurring in each of the frames of the 2D point cloud data 108. In some embodiments, after determining what is present in each of the frames of the 2D point cloud data 108, the solver 114 is configured to generate tLVFs 116 for each frame. In some embodiments, the solver 114 is configured to generate tLVFs 116 for each of the 2D point cloud key frames 110. For example, as illustrated in FIG. 3A, the solver 114 is shown receiving and processing the 2D point cloud data 108, blend shapes 122, and joint files 124 to generate tLVFs 116a-116b for 2D point cloud key frames 110a-110n.

As shown in FIG. 3A, 2D point cloud key frame 110a includes an emotional facial expression of "anger" and a corresponding tLVF 116a that is generated to describe the facial expression that is present in the key frame 110a. 2D point cloud key frame 110b includes an emotional facial expression of "fear" and a corresponding tLVF 116b that is generated to describe the facial expression that is present in the key frame 110b. 2D point cloud key frame 110c includes an emotional facial expression of "sad" and a corresponding tLVF 116c that is generated to describe the facial expression that is present in the key frame 110c. 2D point cloud key frame 110n includes an emotional facial expression of "happiness" and a corresponding tLVF 116n is generated to describe the facial expression that is present in the key frame 116n. Accordingly, in the example shown in FIG. 3A, the solver 114 is configured to generate tLVFs 116 for each of the 2D point cloud key frames 110a-110n. In other embodiments, the solver 114 may be configured to generate tLVFs 116 for each of the frames of the 2D point cloud data 108.

In some embodiments, the plussing 302 operation may be an optional process where an animator reviews the generated tLVFs 116 and the corresponding 2D point cloud key frames 110 and manually adjusts the tLVFs and key frames to improve its accuracy and quality. For example, after the plussing 302 operation, the adjustments can be used as feedback to the system to improve the accuracy and quality of the generated tLVFs 116. In one embodiment, the plussing 302 operation may help improve the accuracy of the tLVFs 116 since a real-person (e.g., designer or animator) may be able to identify the nuisances in the 2D point cloud data and make the necessary adjustments to the key frames and corresponding tLVFs 116. For example, an animator may modify the various weights and values associated with the tLVFs 116 so that it accurately reflects the corresponding 2D point cloud data.

In some embodiments, after the plussing 302 operation, the adjusted tLVFs 116 are feed into the statistical AI 304 operation where statistical AI is used evaluate and learn from the adjusted tLVFs 116 and to determine which tLVFs 116 were inaccurate. In one embodiment, the statistical AI 304 operation learns how to interpret the adjusted tLVFs 116 and the corresponding 2D point cloud data. Over time, as the adjusted tLVFs 116 and its corresponding 2D point cloud data are processed, the statistical AI 304 operation is configured to infer various trends from the patterns. For example, the statistical AI 304 operation may see a pattern of adjusted tLVFs 116 where the values that correspond to a wrinkled nose of an actor is adjusted to correspond to a "disgusted" facial expression rather than a "happy" facial expression. Accordingly, when the solver 114 receives 2D point cloud data 108 that includes a wrinkled nose, the solver 114 and the statistical AI 304 operation may accurately identify this feature as corresponding to a "disgusted" facial expression and be able to accurately generate tLVFs 116 for the corresponding 2D point cloud frame.

Figure 3B:
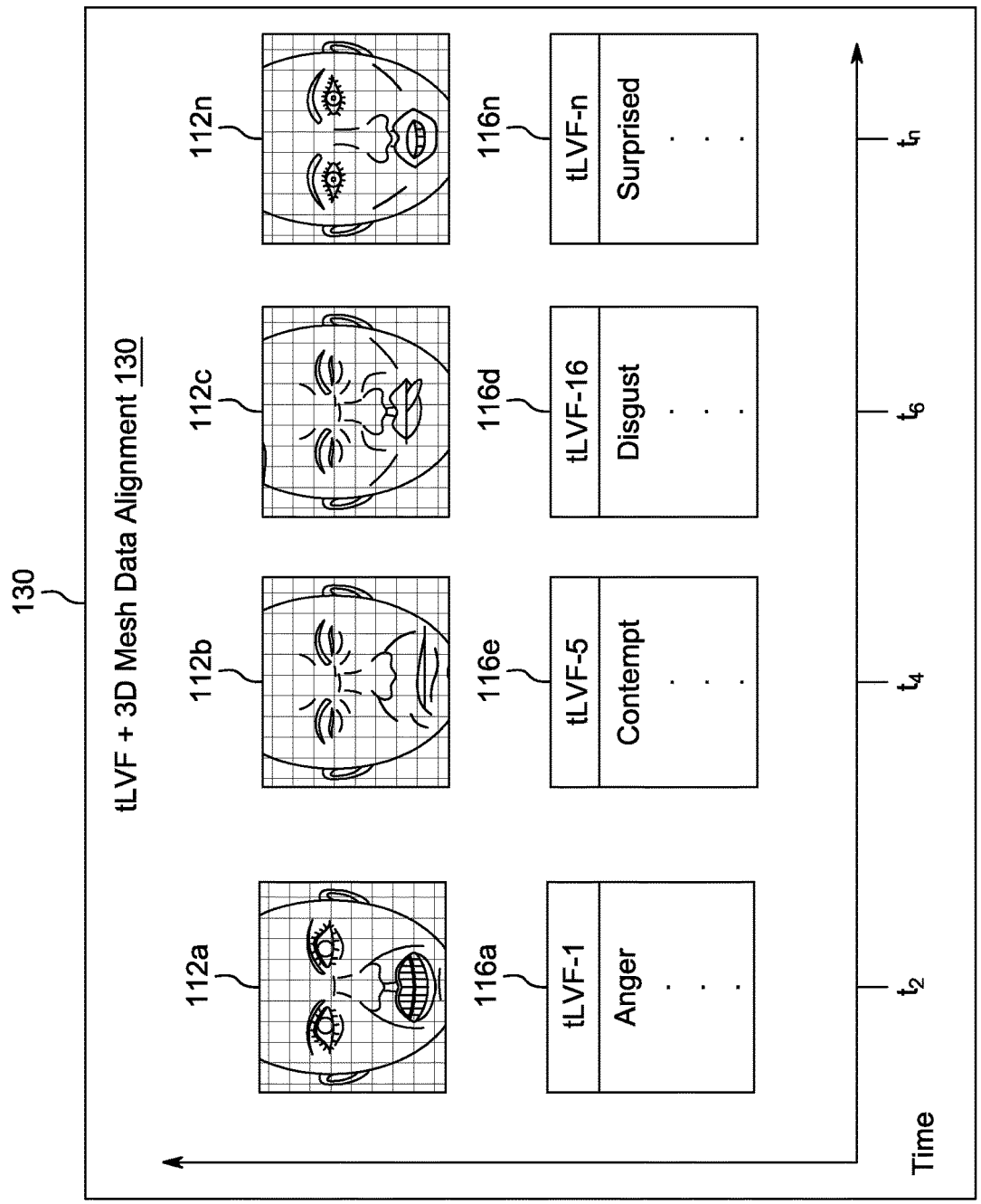
FIG. 3B illustrates an embodiment of processing 3D mesh data in time coordination with the tLVFs to train a model, in accordance with an implementation of the disclosure.

FIG. 3B illustrates an embodiment of processing 3D mesh data 112 in time coordination with the tLVFs 116 to train the model 132. As noted above, the 3D mesh data 112 captured by the 3D camera 104b and the tLVFs 116 are generated by the solver 114. In one embodiment, the alignment operation 130 is configured to align the 3D mesh data 112 with the corresponding tLVFs 116 such that correspondences between the mesh data and the tLVFs are learned by the model 132. The alignment process helps train the model 132 so that the model 132 can learn to make accurate correlations between a given mesh data and an tLVF.

For example, as illustrated in FIG. 3B, the alignment operation 130 is shown processing a plurality of 3D mesh files 112a-112n in time coordination with the tLVFs 116. In one example, mesh file 112a is correlated with tLVF 116a (e.g., anger) at time t2, mesh file 112b is correlated with tLVF 116e (e.g., contempt) at time t4, mesh file 112c is correlated with tLVF 116d (e.g., disgust) at time t6, and mesh file 112n is correlated with tLVF 116n (e.g., surprised) at time tn. Accordingly, over time the model 132 learns the correspondences between the mesh data and the tLVFs and the model 132 can be used to generate LVFs corresponding to any input mesh file.

FIG. 3C illustrates an embodiment of a LVF table 306 illustrating various output LVFs that are generated by the model 132 using input mesh files captured from an actor. In one embodiment, the model 132 is configured to receive input mesh files captured from any actor and to generate output LVFs corresponding to the input mesh files. As shown, the LVF table 306 includes an input mesh file ID 307 and a corresponding output LVF ID 308. In one embodiment, each of the output LVFs may include an emotion type 310, a description 312 of the emotion, and facial feature values 314 that correspond to various facial features (e.g., Facial Feature 1-Facial Feature N) on the face of an actor.

As illustrated in FIG. 3C, each generated output LVF may have a corresponding emotion type 310 that categorizes the output LVF and a description 312 that describes the features in the corresponding input mesh file. For example, as shown in FIG. 3C, input mesh file (e.g., IMF-5) was provided as an input to the model 132 and output LVF (e.g., OLV-5) was generated to correspond to the input mesh file (e.g., IMF-5). As illustrated, output LVF (e.g., OLV-5) includes a facial expression associated with a "disgust" emotion. Further, the description corresponding to output LVF (e.g., OLV-5) includes a brief description of the features of the corresponding input mesh file, e.g., nose wrinkling, upper lip raised.

In some embodiments, each of the output LVFs may include facial feature values 314 that correspond to features on the face of the actor that was used to capture the input mesh files. In one embodiment, the facial feature values 314 associated with the input mesh file may include 50-1500 values. In one example, values are associated with different muscles on the face of the actor. In some embodiments, the facial feature values 314 can range from 0-1. In one embodiment, the facial feature values 314 represent labels that describe the muscle activity on the face present in each input mesh file. For example, a facial feature value of '0' may indicate that the muscle associated with the facial feature is completely relaxed. Conversely, a facial feature value of '1' may indicate that the muscle associated with the facial feature is optimally activated (e.g., as tense as it can be achieved). Accordingly, the more detailed the output LVFs are, the more accurate the animation of the game character will be. The level of detail and the number of values that are provided in the output LVFs may directly affect the quality of the animation of the game character since a higher number of values will generally produce higher quality animations.

To illustrate the facial feature values 314, in one example, as shown in FIG. 3C, output LVF (e.g., OLV-2) includes a facial expression associated with an emotion of "fear." The corresponding input mesh file (e.g., IMF-2) includes facial features such as raised eyebrows, raised upper eyelids, and lips stretched. As illustrated, Facial Feature 5 has a value of '1' which corresponds to a point proximate along the eyebrows of the actor. The value of '1' may indicate that the eyebrows of the actor is tense and optimally activated since the muscles within the region are activated such that the eyebrows are raised as far as it can extend. In another example, for output LVF (e.g., OLV-2), Facial Feature 4 has a value of '0' which corresponds to a point proximate to the bridge of the actor's noise. The value of '0' may indicate the bridge of the actor's noise is completely relaxed and inactive.

Figure 3D:
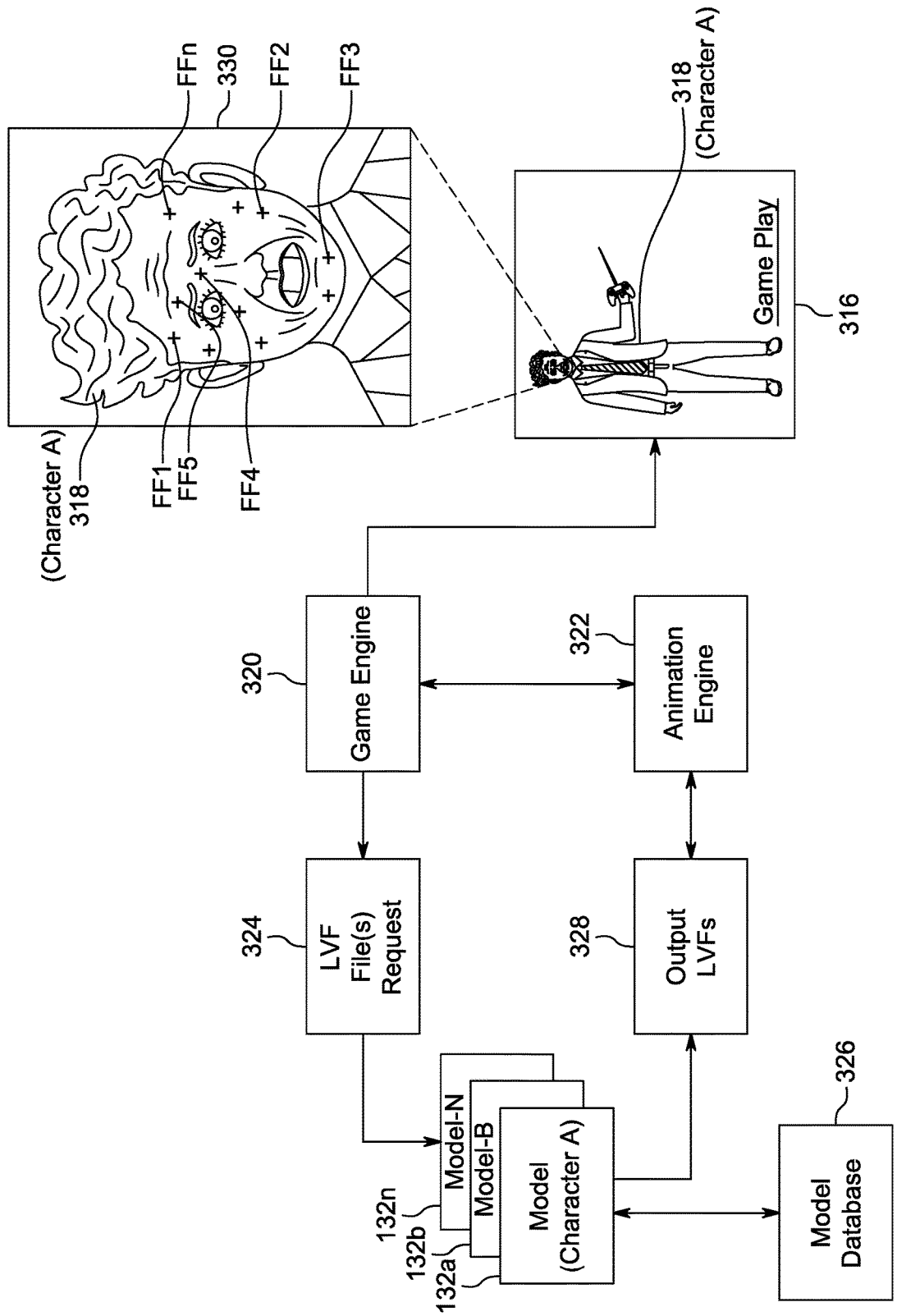
FIG. 3D illustrates an embodiment of a system animating a facial expression of a game character using a model, in accordance with an implementation of the disclosure.

FIG. 3D illustrates an embodiment of a system animating a facial expression of a game character 318 using a model 132. In one embodiment, during a user's gameplay, a game engine 320 is configured to perform an array of functionalities and operations. In one embodiment, the game engine 320 can execute and render the gameplay of a user which may include various game characters and game scenes. As shown in FIG. 3D, the gameplay of a user includes a game scene 316 illustrating a game character 318 using a sword. Based on gameplay and the context of the game scene, the game engine 320 may be configured to determine that the game character 318 requires an "angry" facial expression for a particular game scene (e.g., sword fight). As a result, the game engine 320 sends a request to an LVF file request 324 operation and an input query is submitted to the models 132a-132n to request LVFs that correspond to the "angry" facial expression.

In some embodiments, each model 132a-132n is associated with a specific game character in the video game. Accordingly, depending on which specific game character is to be animated, the corresponding model is configured to generate the requested LVFs. For example, as illustrated in FIG. 3D, since model 132a is associated with game character 318, model 132a can be used to generate the LVFs for game character 318. In some embodiments, the system may include a model database 326. In one embodiment, model database 326 may include the data that corresponds to the LVFs for each of the models 132a-132n. In some embodiments, the models 132a-132n and the model database 326 may work together to generate and retrieve the requested LVFs.

In some embodiments, the output LVFs 328 that are generated by the corresponding model can be retrieved by animation engine 322. In one embodiment, the animation engine 322 is configured to confirm that the output LVFs 328 corresponds to the request from the game engine 320. After confirming that the output LVFs 328 are correct, the animation engine 322 delivers the output LVFs 328 to the game engine 320 so that the game engine 320 can use the output LVFs 328 to animate the facial expression of the game character 318.

As shown in FIG. 3D, display 330 shows an enlarged view of the face of the game character 318. After the game engine 320 uses the output LVFs 328 to animate the facial expression of the game character 318, the game character 318 shows a facial expression associated with an emotion of "angry." As illustrated on the display 330, the face of the game character 318 includes a plurality of facial features that corresponds to a position on the face of the game character, e.g., FF1-FFn. In some embodiments, the output LVFs 328 may include facial feature values that can be applied to the facial features of the game character to animate the "angry" facial expression.

Figure 4:
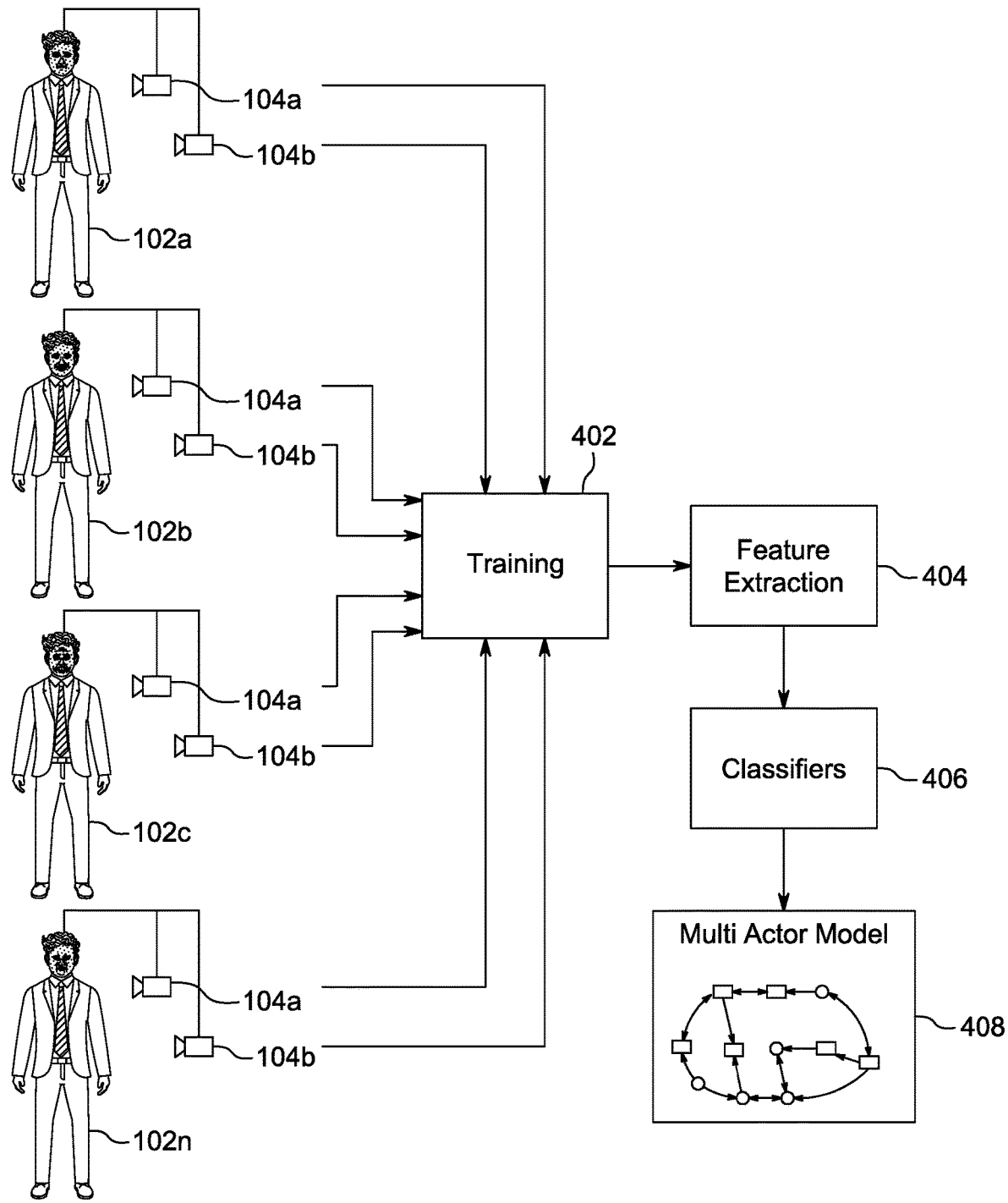
FIG. 4 illustrates an embodiment of a system configured to train a multi-actor model using 3D mesh data and 2D point cloud data captured from a plurality of actors, in accordance with an implementation of the disclosure.

FIG. 4 illustrates an embodiment of a system configured to train a multi-actor model 408 using 3D mesh data and 2D point cloud data captured from a plurality of actors 102a-102n. In one embodiment, FIG. 4 illustrates actors 102a-102n, a training 402 operation, a feature extraction 404 operation, a classifiers 406 operation, and a multi-actor model 408. In one embodiment, each of the actors 102a-102n may be unique and different from one another. For example, each of the actors 102a-102n may have different facial features, physical attributes, acting experiences, skill levels, and each actor may be able to deliver unique performances that the other actors may not be able to perform.

In one embodiment, as each of the actors 102a-102n perform various actions and facial expressions, a 2D camera 104a and a 3D camera 104b is configured to capture 2D point cloud data 108 and 3D mesh data 112 associated with the respective actors 102a-102n. As noted above, in one embodiment, the 2D point cloud data 108 represents tracked dots present on the face of the actors 102a-102n. In another embodiment, 3D mesh data 112 may include 3D depth data of the face of the actors 102a-102n.

In one embodiment, the training 402 operation is configured to receive the capture 2D point cloud data 108 and the 3D mesh data 112 associated with each of the actors for processing to train the multi-actor model 408. In other embodiments, the multi-actor model 408 is configured to receive as inputs blend shape files and joint files. In one embodiment, the training 402 operation is configured use a set of rules in combination with the blend shape and joint files to interpret the 2D point cloud data 108 associated with each of the actors for generating tLVFs. In some embodiments, the training 402 operation may include processing the 3D mesh data in time coordination with the tLVFs to train the multi-actor model 408. For example, as the training 402 operation receives the 3D mesh data and the generated tLVFs, the training 402 operation aligns the 3D mesh data with the corresponding tLVFs 116 such that correspondences between the mesh data and the tLVFs are learned by the multi-actor model 408.

In some embodiments, the system includes a feature extraction 404 operation that is configured to process the output of the training 402 operation (e.g., training data) to identify and extract features associated with the 3D mesh data and the tLVFs. After the feature extraction 404 operation processes and identifies the features from the training 402 operation, the classifiers 406 operation is configured to classify the features using one or more classifiers. In one embodiment, the features are labeled using a classification algorithm for further refining by the multi-actor model 408.

In some embodiments, the multi-actor model 408 is configured to receive as inputs the training data classified features. In another embodiment, other inputs that are not direct inputs or lack of input/feedback, may also be taken as inputs to the multi-actor model 408. The multi-actor model 408 may use a machine learning model to predict output LVFs for a corresponding input mesh file. For example, mesh files of a talented female actor are captured by a 3D camera and used as input queries to the multi-actor model 408. In real-time, the multi-actor model 408 can generate output LVFs that corresponds to the respective captured mesh files which are used by a game engine to animate facial expression of princess warrior character in a video game.

Figure 5:
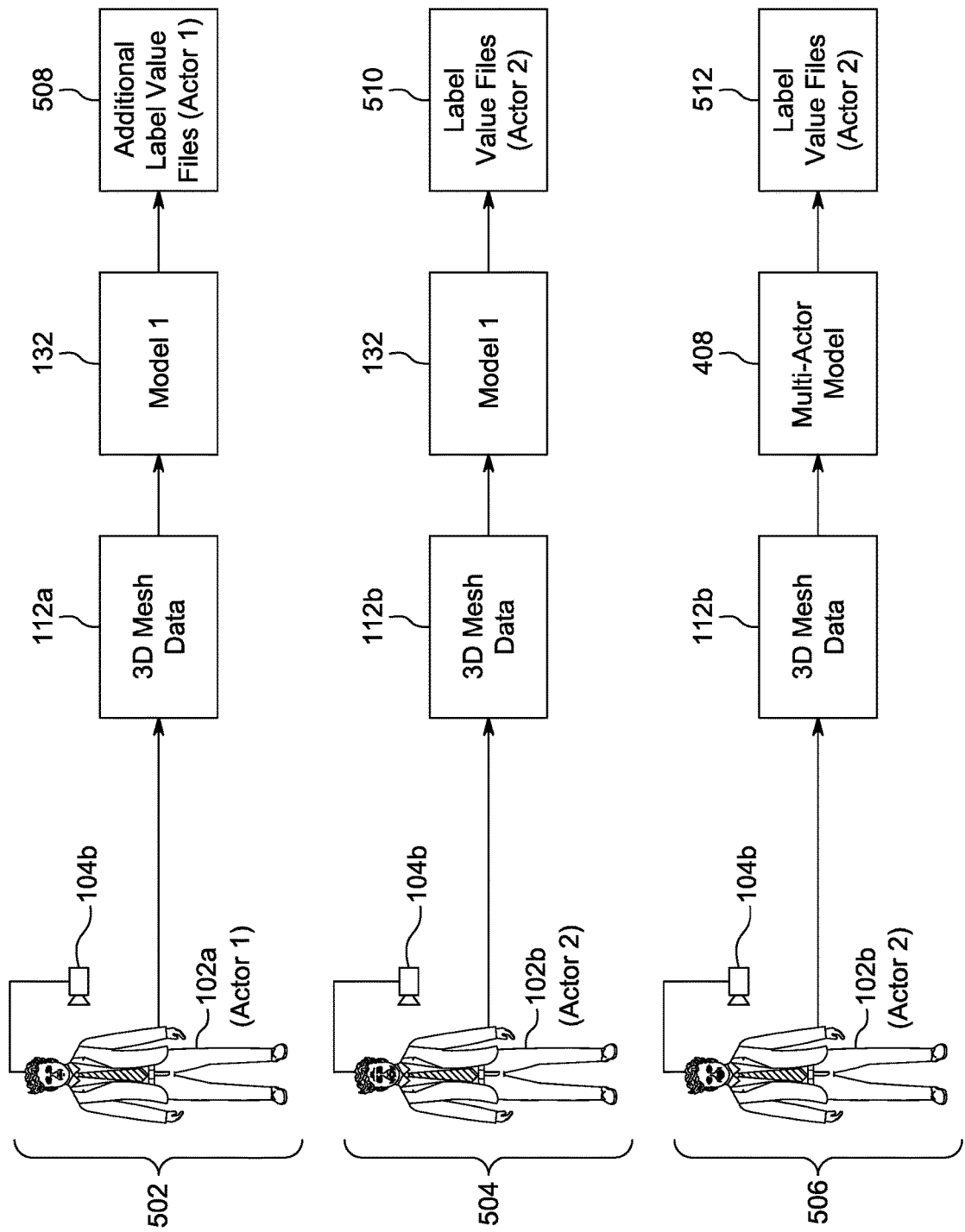
FIG. 5 illustrates various embodiments of a using a model and a multi-actor model to generate output LVFs corresponding to the input 3D mesh data, in accordance with an implementation of the disclosure.

FIG. 5 illustrates various embodiments of a using a model 132 and a multi-actor model 408 to generate output LVFs corresponding to the input 3D mesh data 112. As illustrated, the figure illustrates three examples (e.g., 502, 504, 506) of using a model to generate output LVFs. In one example (e.g., 502), the model 132 is configured to generate additional LVFs 508 that corresponds to the input mesh files of actor 102a. As illustrated, the actor 102a is shown using a headset that includes a 3D camera 104b that is configured to capture 3D mesh data 112a of a face of the actor 102a. The 3D mesh data 112a may include mesh files that can be used as input for the model 132. In one embodiment, since the model 132 was trained using training files (e.g., 2D point cloud, 3D mesh data) that are associated with actor 102a, the model 132 is configured to generate additional LVFs 508 that corresponds to the input mesh files. For example, the 102a actor may be directed to perform additional facial expressions that were not previously captured. Since the model 132 has been trained using an initial set of training data, the model 132 is configured to receive input mesh files that correspond to the additional facial expressions and additional LVFs 508 can be generated to correspond to the input mesh files.

In another example (e.g., 504), the model 132 is configured to generate LVFs 510 that corresponds to the input mesh files of a second actor, e.g., actor 102b. As illustrated, the actor 102b is shown using a headset that includes a 3D camera 104b that is configured to capture 3D mesh data 112b of a face of the actor 102b. In this illustration, the model 132 was trained using training files (e.g., 2D point cloud, 3D mesh data) that are associated with actor 102a (e.g., first actor). However, the model 132 can still be used to generate LVFs 510 that corresponds to the input mesh files of actor 102b (e.g., second actor). In some embodiments, since the model 132 was not trained using training files that are associated with actor 102b (e.g., second actor), the generated LVFs 510 may not be as accurate.

In yet another example (e.g., 506), the multi-actor model 408 is configured to generate LVFs 512 that corresponds to the input mesh files of the second actor, e.g., actor 102b. In this example, the multi-actor model 408 was trained using training files (e.g., 2D point cloud, 3D mesh data) that are associated with a plurality of actors 102a-102n. In some embodiments, since the multi-actor model 408 was trained using training files that are associated with a plurality of actors 102a-102n, the generated LVFs 512 may be more accurate than the LVFs 510 that was generated using the model 132.

Figure 6:
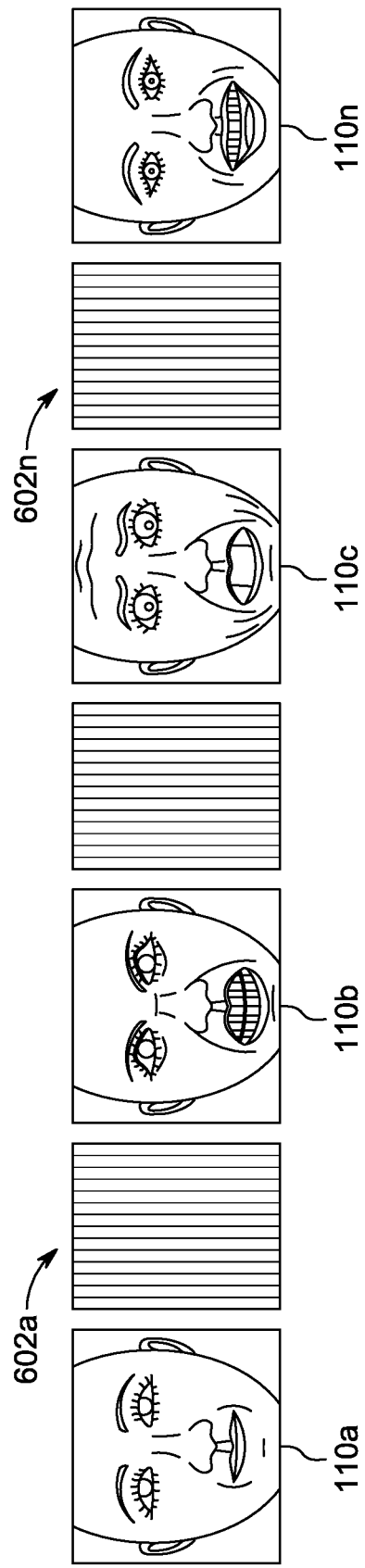
FIG. 6 illustrates an embodiment of 2D point cloud data which includes 2D point cloud key frames and transition frames, in accordance with an implementation of the disclosure.

FIG. 6 illustrates an embodiment of 2D point cloud data 108 which includes 2D point cloud key frames 110a-110n and transition frames 602a-602n. In one embodiment, the system is configured to process only the 2D point cloud key frames 110 to generate the tLVFs which can help save bandwidth and reduce redundancies. In other embodiments, the system is configured to also process all of the frames of the 2D point cloud data 108 including the transition frames 602. As more frames are processed for training the model 132 and the multi-actor model 408, the output LVFs generated by the models becomes more accurate and more reliable. In one embodiment, the transition frames 602 may include relevant data that can be used by the system for training the models. For example, when an actor 102 acts and produces a specific facial expression (e.g., sad, happy, scared, etc.), the transition frames 602 may include various facial expressions and poses that are inadvertently made as the actor transitions from one specific facial expression to another. In one embodiment, the transition frames 602 may be processed by the system so that the model can learn and understand what features are in the transition frames 602.

For example, as illustrated in FIG. 6, 2D point cloud data 108 includes a plurality of 2D point cloud key frame 110a-110n and transition frames 602a-602n. In particular, 2D point cloud key frame 110a include features that correspond to a facial expression indicating "happiness." 2D point cloud key frame 110b include features that correspond to a facial expression indicating "sadness." 2D point cloud key frame 110c include features that correspond to a facial expression indicating "surprised." 2D point cloud key frame 110n include features that correspond to a facial expression indicating "annoyed." As an actor 102 transitions from one facial expression to another, the transition frames 602a-602n may include relevant data that can be processed for learning by the models.

Figure 7:
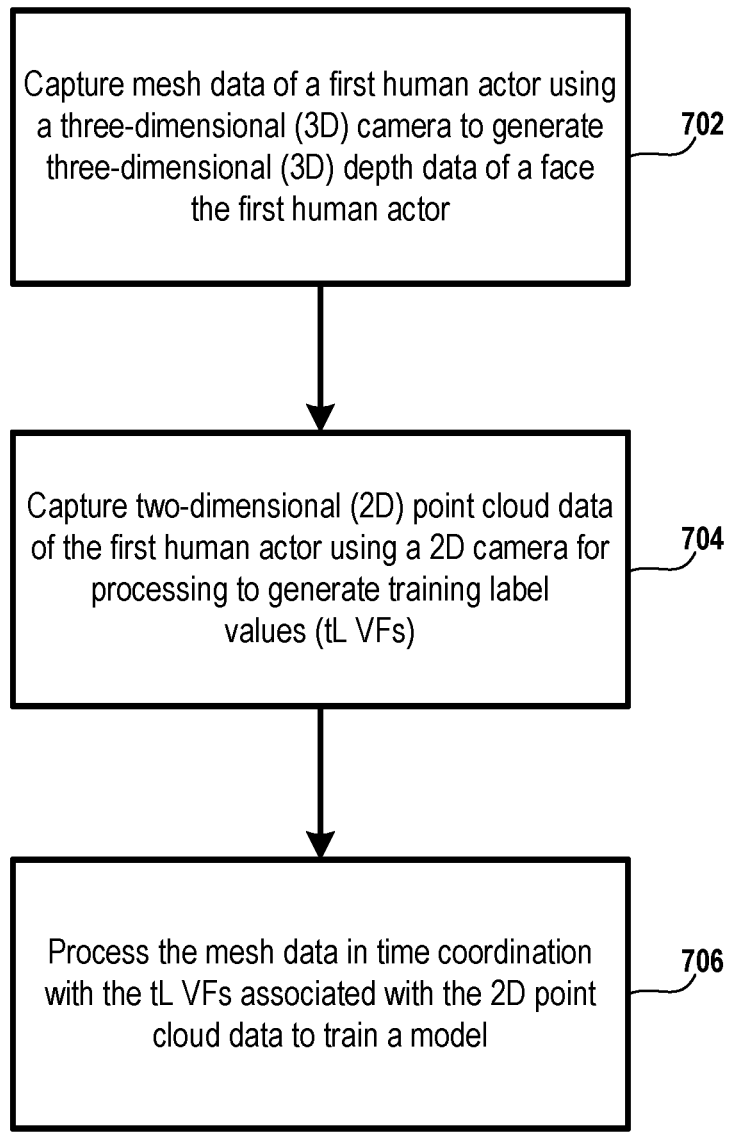
FIG. 7 illustrates a method for training a model used for animating a facial expression of a game character, in accordance with an implementation of the disclosure.

FIG. 7 illustrates a method for training a model used for animating a facial expression of a game character. In one embodiment, the method includes an operation 702 that is configured to capture mesh data of a first human actor 102a using a 3D camera 104b to generate 3D depth data of a face of the first human actor. In some embodiments, the 3D depth data is output as mesh files corresponding to a frame captured by the 3D camera. For example, the first human actor 102a may be wearing a headset that includes a plurality of cameras that includes a 2D camera 104a and 3D camera 104b. As the first human actor 102a poses and performs various facial expresses to expresses various emotional states (e.g., joy, sadness, fear, anger, surprise, disgust, contempt, panic, etc.), the 3D camera 104b is configured to capture the mesh data of the face of the first human actor to generate 3D depth data which can be used to create a 3D model of the face of the first human actor.

The method shown in FIG. 7 then flows to operation 704 where the operation is configured to capture 2D point cloud data of the first human actor 102a using a 2D camera 104a for processing to generate tLVFs 116. In some embodiments, first human actor 102a may have a dot pattern 202 (e.g., markers) disposed along the face of the actor. In one embodiment, the 2D point cloud data that is captured by the 2D camera 104a represents the tracking of the dot pattern that is present on the face of the actor. Accordingly, since the 2D point cloud data includes information related to the tracking of the dot pattern, the movement of the facial features of the actor can be measured and determined at any point in time.

In some embodiments, operation 704 is configured to generate training label value files (tLVFs) using a solver. In one embodiment, the solver is configured to receive 2D point cloud data of the first human actor 102a, blend shapes 122, and joint files 124. In some embodiments, the solver may include a set of rules that are used with the blend shape and joint files to determine what is occurring in each of the frames in the 2D point cloud data and to generate tLVFs for each one of the respective frames.

The method shown in FIG. 7 then flows to operation 708 where the operation is configured to process the mesh data in time coordination with the tLVFs associated with the 2D point cloud data to train the model 132. In one embodiment, the operation 708 aligns the mesh data with the corresponding tLVFs such that correspondences between the mesh data and the tLVFs are learned by the model 132. The alignment process helps train the model 132 so that the model 132 can learn to make accurate correlations between a given mesh data and an LVF.

In one embodiment, after the model 132 has been trained, the model 132 is configured to receive as input mesh files captured from a second human actor 102b or any actor. Using the input meshes files associated with an actor, the model 132 can be used to generate output LVFs that corresponds to the input mesh files. Accordingly, the trained model 132 can simply use the input mesh files associated with any actor to generate output LVFs which can be used to animate a facial expression of a game character.

Figure 8:
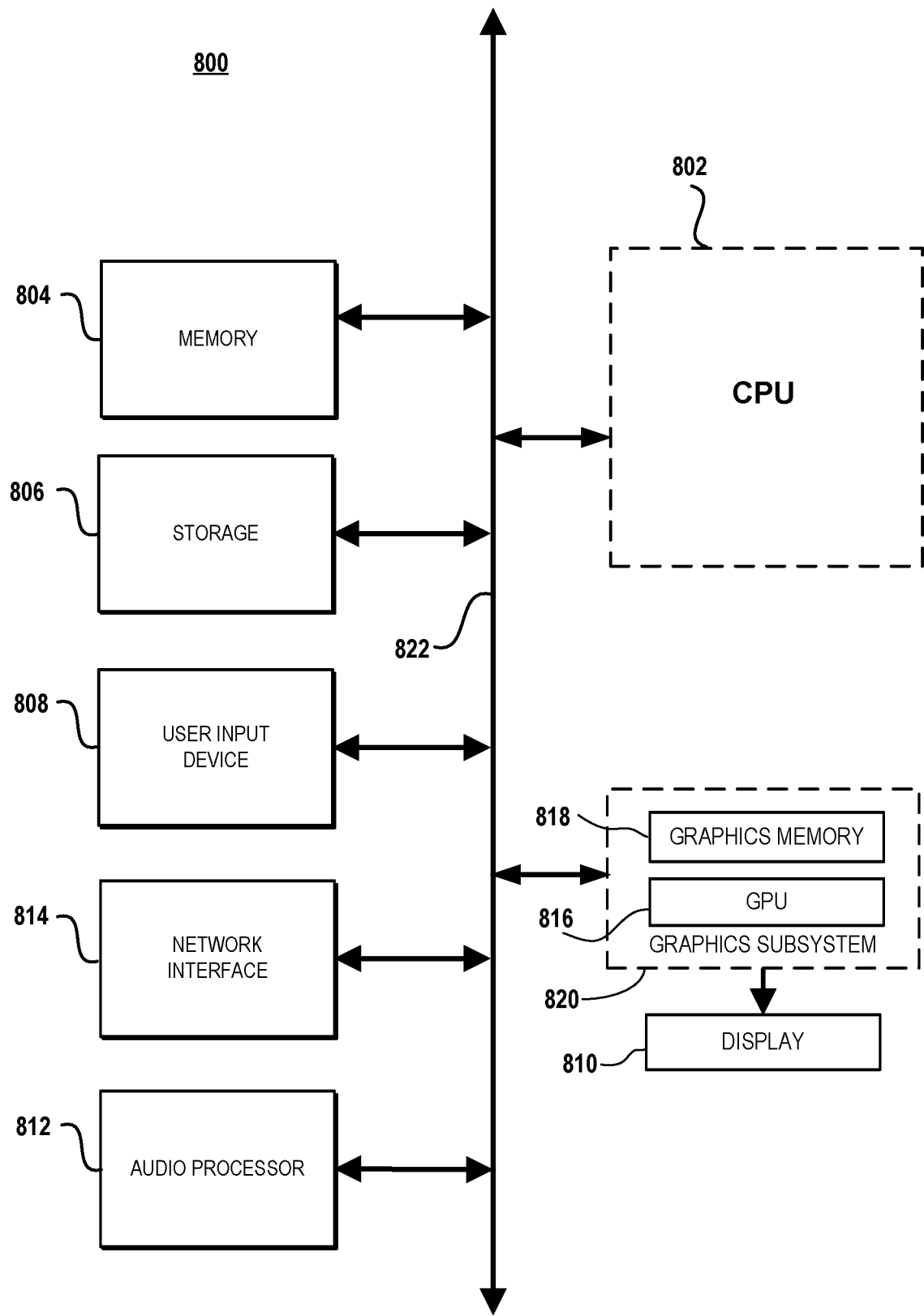
FIG. 8 illustrates components of an example device that can be used to perform aspects of the various embodiments of the present disclosure.

FIG. 8 illustrates components of an example device 800 that can be used to perform aspects of the various embodiments of the present disclosure. This block diagram illustrates a device 800 that can incorporate or can be a personal computer, video game console, personal digital assistant, a server or other digital device, suitable for practicing an embodiment of the disclosure. Device 800 includes a central processing unit (CPU) 802 for running software applications and optionally an operating system. CPU 802 may be comprised of one or more homogeneous or heterogeneous processing cores. For example, CPU 802 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 800 may be a localized to a player playing a game segment (e.g., game console), or remote from the player (e.g., back-end server processor), or one of many servers using virtualization in a game cloud system for remote streaming of gameplay to clients.

Memory 804 stores applications and data for use by the CPU 802. Storage 806 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 808 communicate user inputs from one or more users to device 800, examples of which may include keyboards, mice, joysticks, touch pads, touch screens, still or video recorders/cameras, tracking devices for recognizing gestures, and/or microphones. Network interface 814 allows device 800 to communicate with other computer systems via an electronic communications network, and may include wired or wireless communication over local area networks and wide area networks such as the internet. An audio processor 812 is adapted to generate analog or digital audio output from instructions and/or data provided by the CPU 802, memory 804, and/or storage 806. The components of device 800, including CPU 802, memory 804, data storage 806, user input devices 808, network interface 810, and audio processor 812 are connected via one or more data buses 822.

A graphics subsystem 820 is further connected with data bus 822 and the components of the device 800. The graphics subsystem 820 includes a graphics processing unit (GPU) 816 and graphics memory 818. Graphics memory 818 includes a display memory (e.g., a frame buffer) used for storing pixel data for each pixel of an output image. Graphics memory 818 can be integrated in the same device as GPU 808, connected as a separate device with GPU 816, and/or implemented within memory 804. Pixel data can be provided to graphics memory 818 directly from the CPU 802. Alternatively, CPU 802 provides the GPU 816 with data and/or instructions defining the desired output images, from which the GPU 816 generates the pixel data of one or more output images. The data and/or instructions defining the desired output images can be stored in memory 804 and/or graphics memory 818. In an embodiment, the GPU 816 includes 3D rendering capabilities for generating pixel data for output images from instructions and data defining the geometry, lighting, shading, texturing, motion, and/or camera parameters for a scene. The GPU 816 can further include one or more programmable execution units capable of executing shader programs.

The graphics subsystem 814 periodically outputs pixel data for an image from graphics memory 818 to be displayed on display device 810. Display device 810 can be any device capable of displaying visual information in response to a signal from the device 800, including CRT, LCD, plasma, and OLED displays. Device 800 can provide the display device 810 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for training a model used for animating a facial expression of a game character, comprising:
    capturing mesh data of a first human actor using a three-dimensional (3D) camera to generate three-dimensional (3D) depth data of a face of the first human actor, the 3D depth data being output as mesh files corresponding to frames captured by the 3D camera;
    capturing two-dimensional (2D) point cloud data of the first human actor using a 2D camera, the 2D point cloud data represents tracked dots present on the face of the first human actor, the 2D point cloud data being processed to generate training label value files (tLVFs); and
    processing the mesh data in time coordination with the tLVFs associated with the 2D point cloud data to train the model;
    wherein the model is configured to receive input mesh files captured from a second human actor and generate as output LVFs corresponding to the input mesh files.

2. The method of claim 1, wherein the generated tLVFs identify facial expressions present in the 2D point cloud data.

3. The method of claim 1, wherein the output LVFs are configured to be received by a game engine for animating the facial expression of the game character.

4. The method of claim 1, wherein the output LVFs includes a plurality of values that correspond to features on the face of the first human actor, said values being used for animating the facial expression of the game character.

5. The method of claim 4, wherein the plurality of values are configured to cause muscle activation in respective areas on a face of the game character.

6. The method of claim 1, wherein a solver is configured to receive as inputs the 2D point cloud data, blend shape files, and joint files for processing to generate the tLVFs, said solver applying a set of rules to generate the tLVFs.

7. The method of claim 6, wherein the solver uses statistical artificial intelligence for processing the 2D point cloud data, the blend shape files, and the joint files to generate the tLVFs.

8. The method of claim 1, wherein the tLVFs are plussed by an animator to cause adjustments to the tLVFs, said adjusted tLVFs are received as feedback by a solver to improve accuracy of the generated tLVFs.

9. The method of claim 1, wherein the 2D point cloud data includes 2D point cloud key frames, said 2D point cloud key frames are processed to generate the tLVFs.

10. The method of claim 1, wherein the model is a multi-actor model, said multi-actor model is trained using mesh data and 2D point cloud data from a plurality of human actors.

11. The method of claim 1, wherein the output LVFs corresponds to an emotion type, said emotion type is expressed by the second human actor to generate the input mesh files.

12. The method of claim 1, the model is configured to receive as input additional mesh files of the first human actor to generate additional output LVFs.

13. The method of claim 1, wherein the model is configured to identify features from the mesh data and the 2D point cloud data to classify attributes of the mesh data and the 2D point cloud data, the attributes being used for generating the output LVFs corresponding to the input mesh files.

14. The method of claim 1, wherein the second human actor can be the same or different than the first human actor.

15. A method for generating label values for facial expressions using three-dimensional (3D) image capture, comprising:
    accessing a model that is trained using inputs captured from a first human actor;
    the inputs captured include mesh data of a face of the first human actor, the mesh data representing three-dimensional (3D) depth data of the face;
    the inputs captured further include two-dimensional (2D) point cloud data of the face of the first human actor, the 2D point cloud data represents tracked dots present on the face of the first human actor, the 2D point cloud data being processed to generate training label value files (tLVFs);
    the model being trained by processing in time coordination the mesh data and the tLVFs, such that correspondences between the tLVFs and the mesh data are learned by the model; and capturing mesh files that include mesh data of a face of a second human actor, the mesh files being provided as input queries to the model to request label value files (LVFs) that correspond to respective ones of the captured mesh files;

wherein the LVFs are usable by a game engine to animate a facial expression of a game character presented in a game processed by the game engine.

16. The method of claim 15, wherein the generated tLVFs identify facial expressions present in the 2D point cloud data.

17. The method of claim 15, wherein the LVFs includes a plurality of values, said plurality of values are configured to cause muscle activation in respective areas on a face of the game character.

18. The method of claim 15, wherein the second human actor can be the same or different than the first human actor.

19. The method of claim 15, wherein a solver is configured to receive as inputs the 2D point cloud data, blend shape files, and joint files for processing to generate the tLVFs, said solver applying a set of rules to generate the tLVFs.

20. The method of claim 15, wherein the model is a multi-actor model, said multi-actor model is trained using mesh data and 2D point cloud data from a plurality of human actors.

* * * * *